May 15, 1945. C. H. WITTHOFFT 2,376,106
AGITATING MECHANISM
Filed June 12, 1944 2 Sheets-Sheet 1
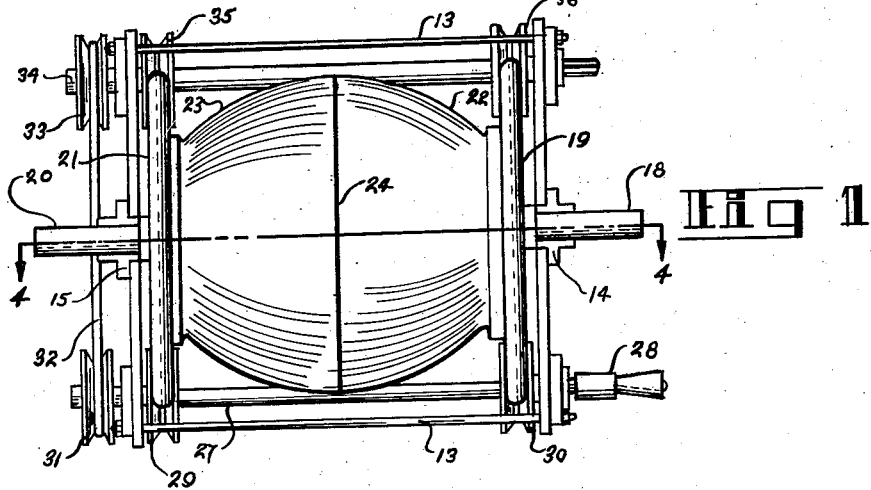
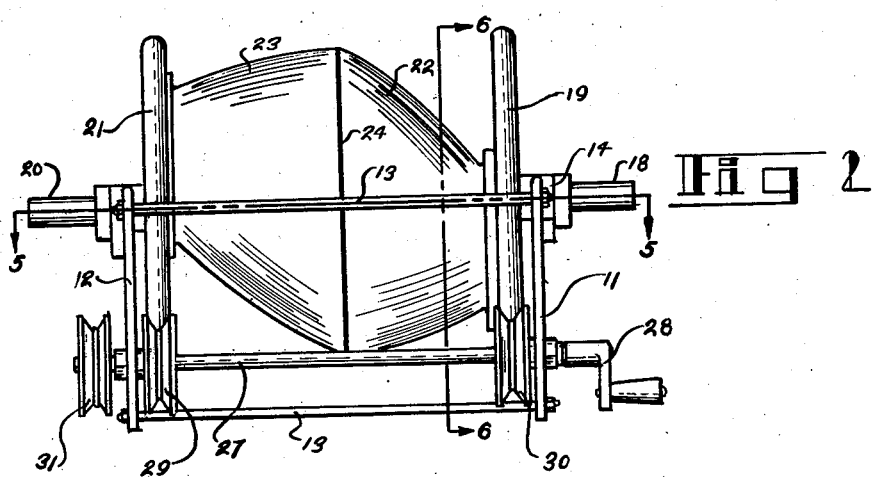
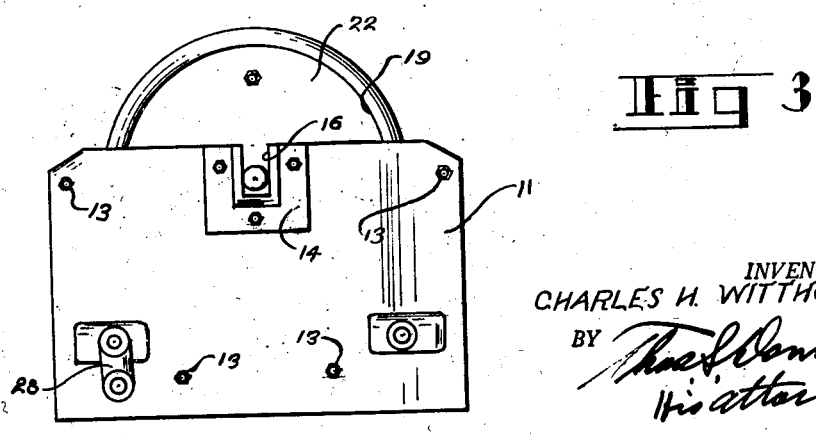
INVENTOR.
CHARLES H. WITTHOFFT
BY
His attorney May 15, 1945.           C. H. WITTHOFFT            2,376,106
                         AGITATING MECHANISM
                         Filed June 12, 1944           2 Sheets-Sheet 2
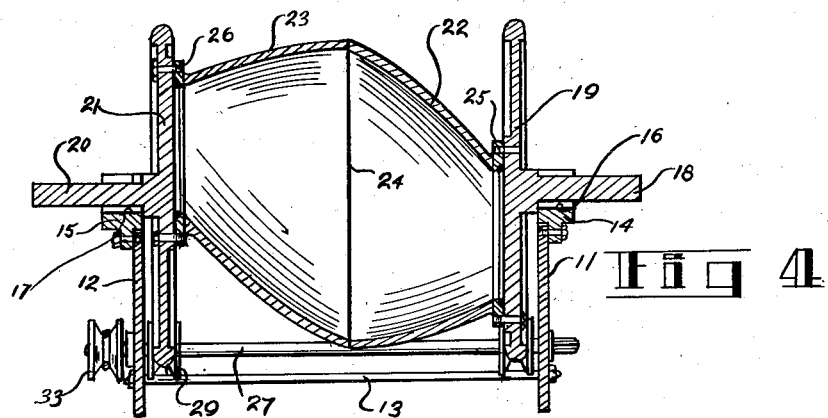
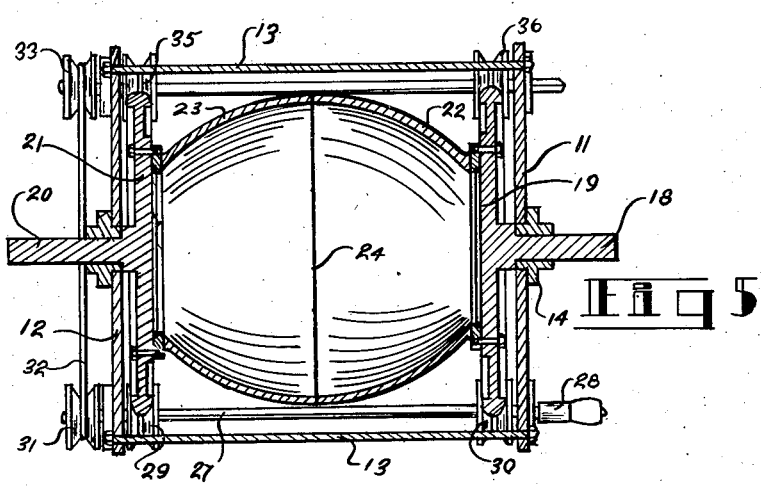
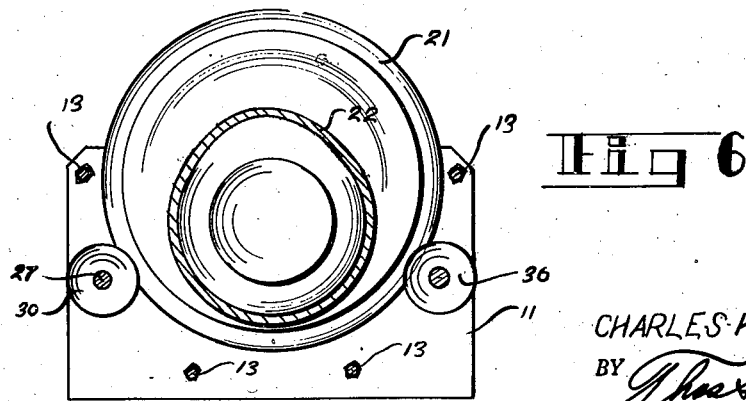
INVENTOR.
CHARLES H. WITTHOFFT
BY
His attorney

Patented May 15, 1945

2,376,106

UNITED STATES PATENT OFFICE 2,376,106

AGITATING MECHANISM

Charles H. Witthofft, Detroit, Mich., assignor of one-half to Joseph F. Gohn, Grosse Ile, Mich.

Application June 12, 1944, Serial No. 539,963

5 Claims. (Cl. 51—164)

My invention relates to a new and useful improvement in an agitating device adapted for use in agitating various articles and serving in many respects as a tumbler. The mechanism lends itself for use in tumbling or agitating castings, metal products, for removing burrs and projections therefrom, and will also serve as a means for agitating vegetables, such as potatoes, carrots or the like, in the presence of suitable abrasive, for the purpose of peeling or removing the skin therefrom.

It is an object of the present invention to provide a mechanism of this type which will be simple in structure, economical of manufacture, durable, compact, light, easily operated and highly efficient in use.

It is another object of the present invention to provide a mechanism of this type whereby the tumbling barrel may be easily and quickly removed from its mountings for emptying and for filling.

Another object of the invention is the provision of a structure whereby the tumbling barrel may be rotatably mounted on suitable supports in such a manner that it may be easily removed and in such a manner that vibration and distortion will be reduced to a minimum.

Other objects will appear hereinafter.

It is recognized that various changes and modifications may be made in the detail of structure illustrated without departing from the invention itself and it is intended that such variations and changes shall be encompassed within the scope of the claims which form a part hereof.

Forming a part of this specification are drawings in which,

Fig. 1 is a top plane view of the invention;

Fig. 2 is a side elevational view of the invention;

Fig. 3 is an end elevational view of the invention;

Fig. 4 is a sectional view taken on line 4—4 of Fig. 1;

Fig. 5 is a sectional view taken on line 5—5 of Fig. 2;

Fig. 6 is a sectional view taken on line 6—6 of Fig. 2.

As shown in the drawings, the invention comprises suitable supporting standards 11 and 12 which I have formed in the shape of plates. These supporting standards are connected together and held in fixed relation by means of suitable stay rods 13. Mounted on the upper side of the standard 11 centrally thereof is a bearing block 14 which is in horizontal alignment with a similar bearing block 15 mounted on the upper side of the standard 12 centrally thereof. The bearing block 14 has a recess 16 in which the shaft 18 is positioned and in which it rotates. This shaft 18 projects centrally outwardly from a disk 19. The bearing block 15 is provided with a recess 17 in which the shaft 20 rests and rotates. The shaft 20 projects centrally outwardly from the disk 21. The shafts 18 and 20 are in alignment and their axes are in the same horizontal plane. A tumbling barrel or container is provided, which I prefer to form from a pair of sections 22 and 23 which are butt-welded together along line 24. These sections 22 and 23 approach in formation a frustro-conical structure. Projecting outwardly from the small end of the section 22 is an outwardly directed flange 25 which is fastened to the disk 19 eccentrically thereof with a portion thereof lying on one side of the axis of the shaft 18 and a larger portion thereof lying on the opposite side of the shaft 18. A section 23 is provided with the outwardly directed flange 26 at its lower end and this flange 26 is secured to the disk 21 eccentrically thereof with a portion lying on one side of the axis of the shaft 20 and the major portion thereof lying on the opposite side of the shaft 20. It will be noted that the eccentricity of these sections 22 and 23 are opposite to each other, the larger portion of the section 23 lying above the axis of the shaft 20, in Fig. 4, and the major section of the shaft 22 extending below the axis of its shaft 18. Extending through and journaled in the standards 11 and 12 is a shaft 27. Fixedly mounted on the shaft 27 is a pulley 29 in which the periphery of the disk 21 is adapted to ride. Fixedly mounted on the shaft 27 is a pulley 30 in which the periphery of the disk 19 is adapted to ride, the shaft 27 being rotatable by a crank 28. It is believed obvious that, if desired, the crank 28 may be replaced with a power drive. Projecting through and journaled in the standards 11 and 12 is a shaft 31 on which are fixedly mounted the pulleys 33, 35 and 36. The pulley 35 serves as a support for the disk 21 and the pulley 36 serves as a support for the disk 19. Thus, it is obvious that the pulley 30 and the pulley 36 serve to form a sort of cradle on which the disk 19 rests and a similar cradle for the disk 21 is provided by the pulleys 29 and 35. Fixedly mounted on the shaft 27 is a pulley 31 which is connected with the pulley 33 by the belt 32. The construction is such that when the articles are placed in the barrel, this barrel may be rotated by a rotation of the shaft 27. The rotation of the shaft 27 will also, through the belt 32, effect a rotation of the shaft 34. As the barrel is rotated, the articles in the section 22, in the position shown in Fig. 4, will be at the bottom of the structure and when one-half of a revolution has been made, these articles will be elevated to the top and discharged into the section 23, which will have reversed its position relatively to the section 22, as shown in Fig. 4. In this way, I have provided an agitating device which will, upon rotation of the container or barrel, effect a rotation of the articles in the container or barrel and will at the same time effect an alternate discharge of the articles in the barrel from one side to the other, resulting in a most effective operation on the articles in the barrel whether they are metal articles being tumbled for removing projections and burrs, for shining the same, or whether they are vegetables being tumbled in the presence of suitable abrasives, such as small particles of coke, for cleaning off the skin.

When it is desired, the barrel may be raised upwardly so that the shafts 18 and 20 will disengage from the recesses 16 and 17, whereupon the barrel may be moved outwardly from between the supporting standards. Removal of one of the disks will then permit access to the interior of the barrel so that the barrel may be emptied and refilled.

What I claim as new is:

1. An agitating device of the class described, comprising: a pair of supporting standards in spaced relation to each other; a bearing mounted on each of said standards, said bearings being in alignment; a container; a shaft projecting outwardly from each end of said container, said shafts being in alignment and projecting outwardly eccentrically from the adjacent end of the container; and means for rotating said container.

2. An agitating device of the class described, comprising: a pair of vertically directed, spaced apart supporting standards; a bearing on each of said standards, said bearings being in alignment with each other; a barrel-shaped container comprising a pair of frustro-conical sections joined together at their large ends and radially offset from each other at their smaller ends; a disk mounted on the smaller end of each of said sections, said smaller ends of said sections being eccentric of its respective disk; a shaft projecting outwardly centrally from each of said disks and rotatably mounted on said bearings; and means engageable with said disks for rotating said container.

3. An agitating device of the class described, comprising: a pair of spaced apart, vertically directed supporting standards; a bearing mounted on each of said standards, said bearings being in alignment with each other; a pair of circular disks of the same radius; a shaft projecting outwardly from one face of each of said disks, centrally thereof, the shafts being rotatably mounted on said bearings and lying in a horizontal plane; a container, bulged at its central portion to provide a pair of reducing ends, the ends of said container being mounted on the opposed faces of said disks eccentrically thereof, one end being positioned eccentrically below the axis of said shafts and the other being positioned eccentrically above the axis of said shafts; cradle-forming pulleys for engaging said disks and supporting the same; and means for rotating said pulleys.

4. An agitating device of the class described, comprising: a pair of vertically directed, spaced apart standards; a bearing mounted on each of said standards adjacent the upper side thereof, said bearings being in horizontal alignment with each other; a pair of shafts projected through said standards axially of said bearings and below the same and transversely spaced apart on said standards; a pair of pulleys mounted on each of said shafts in fixed relation thereto between said standards; a pulley mounted on each of said shafts in fixed relation thereto exterior of said standards; a belt for connecting said exteriorly positioned pulleys for driving the same in unison with each other; means for rotating one of said shafts; a pair of circular disks of equal radius; a shaft projecting outwardly from one face of each of said disks centrally thereof and resting in and rotatable in said bearings, the periphery of each of said disks engaging a pair of pulleys positioned between said standards and rotatable thereby, said disks being positioned between said standards adjacent thereto; a container mounted on said disks and lying between the same, one side of said container being eccentric of its disk below the axis thereof and the other side of said container being eccentric of said disk above the axis thereof.

5. An agitating device of the class described, comprising: a pair of vertically directed, spaced apart standards; a bearing mounted on each of said standards adjacent the upper side thereof, said bearings being in horizontal alignment with each other; a pair of shafts projected through said standards axially of said bearings and below the same and transversely spaced apart on said standards; a pair of pulleys mounted on each of said shafts in fixed relation thereto between said standards; a pulley mounted on each of said shafts in fixed relation thereto exterior of said standards; a belt for connecting said exteriorly positioned pulleys for driving the same in unison with each other; means for rotating one of said shafts; a pair of circular disks of equal radius; a shaft projecting outwardly from one face of each of said disks centrally thereof and resting in and rotatable in said bearings, the periphery of each of said disks engaging a pair of pulleys positioned between said standards and rotatable thereby, said disks being positioned between said standards adjacent thereto; a container mounted on said disks and lying between the same, one side of said container being eccentric of its disk below the axis thereof and the other side of said container being eccentric of said disk above the axis thereof, said shafts on said disks being insertable in said bearings through openings formed in the upper side of said bearings.

CHARLES H. WITTHOFFT.